Oct. 21, 1952　　　W. I. NISSEN　　　2,614,408
CIGAR LIGHTER WINDSHIELD STRUCTURE
Filed Nov. 3, 1949
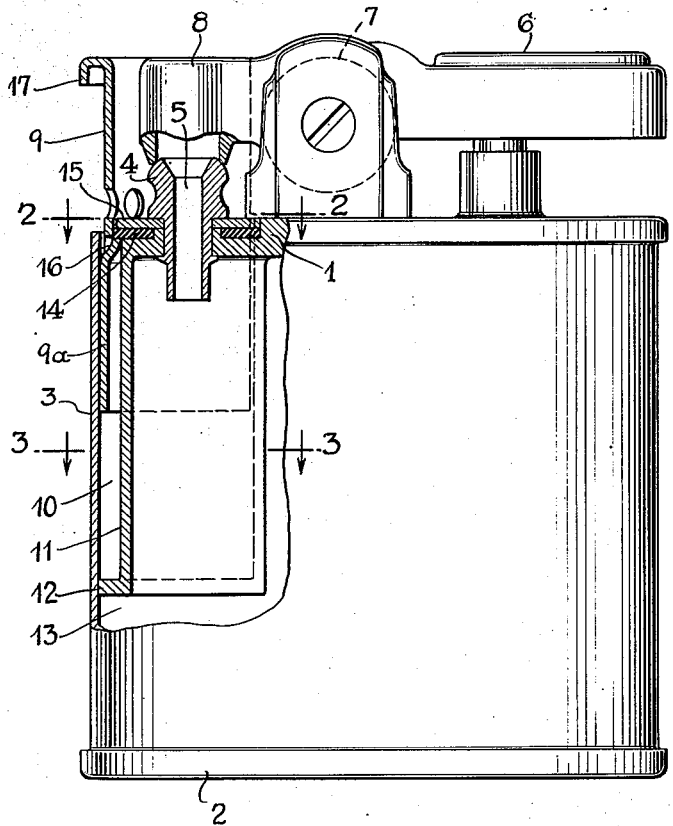
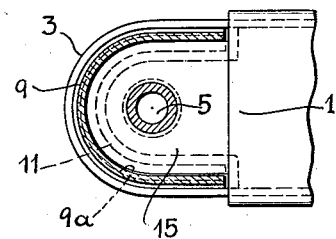
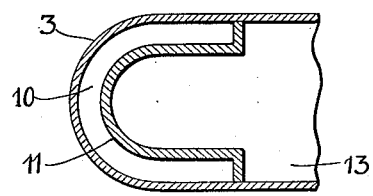
INVENTOR.
WARREN I. NISSEN.
BY
ATTORNEYS.

Patented Oct. 21, 1952

2,614,408

UNITED STATES PATENT OFFICE 2,614,408

CIGAR LIGHTER WINDSHIELD STRUCTURE

Warren I. Nissen, Newark, N. J., assignor to Ronson Art Metal Works, Inc., Newark, N. J., a corporation of New Jersey Application November 3, 1949, Serial No. 125,190

2 Claims. (Cl. 67—7.1)

The invention relates to cigar lighters of the type wherein a windshield is provided which is slidable between an active position wherein the flame is shielded, and an inactive position wherein the windshield disappears, so to speak, into the casing structure. In lighters of the above type as heretofore constructed, in so far as I am aware, the windshield, for practical reasons, has been quite loosely engaged with the surfaces associated with the lighter casing along which it slides, with the result that the windshield was not accurately guided or held in proper position during its movements, and at times shifted out of proper position or shape and could be moved only with difficulty; also foreign matter at times lodged between the windshield and adjacent surfaces of the lighter casing to clog up the adjustment of the windshield. The present invention aims primarily to minimize objections of the above character; in accordance therewith, the passageway in the casing in which the windshield slides affords clearance for movement of the windshield as heretofore, but the casing is also provided with an elastic member which partially overhangs said passageway and fits closely and yieldingly against the windshield as hereinafter described in greater detail, to accurately guide and hold the windshield in proper position during and after adjustment. It is found that such a construction eases the movement of the windshield and positions the latter accurately with respect to the surfaces of the casing along which the windshield slides, and also minimizes the accumulation of foreign material in the passageway in which the windshield slides. Further objects and advantages of the invention will be in part obvious and in part specifically referred to in the description hereinafter contained which, taken in conjunction with the accompanying drawings, discloses a preferred form of lighter constructed in accordance with the invention. In the drawings—

Fig. 1 is a side elevation of a lighter constructed in accordance with the invention, a portion thereof being cut away to show the parts of the lighter with which the invention is more particularly concerned.

Figs. 2 and 3 are sections taken respectively on broken lines 2—2 and 3—3 looking in the direction of the arrows.

The invention is disclosed as applied to a lighter having a fuel casing comprising top and bottom walls 1 and 2 respectively, and a shell 3 which constitutes the exterior side wall of the casing. A tube 4 is shown as passing through the top wall 1, and having a burner opening 5. The present invention is not particularly concerned with the specific fuel employed or the manner in which the fuel is ignited after passing through the tube 4, but for purposes of illustration I have shown an igniting mechanism of the character disclosed in the patent to Aronson No. 2,002,845, issued May 28, 1935, including a fingerpiece 6, a sparking wheel 7, and a closure cap 8 which is mounted to move between burner covering and burner exposing positions.

The windshield 9 when in active position, largely surrounds the space above the burner opening 5 in which the flame is produced, this windshield member being of U-shaped cross section as shown in Figs. 2 and 3. The lower portion 9a of the windshield member, as shown in Fig. 1, is received within a passageway 10 within the lighter casing, this passageway 10 being of cross sectional shape similar to the windshield member 9a but being somewhat wider than the thickness of the windshield. In the illustrated form of the invention the outer wall of the passageway 10 is constituted by the adjacent portion of the shell 3, and the inner wall of such passageway is constituted by an interior web 11 depending from the top wall 1 of the casing, this web 11 being also of U-shaped cross section, and having a flange 12 (Fig. 1) at the inner end thereof, to seal off the passageway 10 from the fuel chamber 13 of the casing. The outer wall 9a of the windshield may engage closely with the outer wall of passageway 10, but as shown in Fig. 1, clearance is provided between the windshield wall 9a and the inner wall 11 of the passageway 10.

The portion of the casing top wall 1 which is bounded by the passageway 10, is provided with a strip 14 of elastic material, for example synthetic rubber, which partially overhangs the passageway 10 and is shaped to fit closely against the adjacent inner wall of windshield 9, this strip 14 being held in position for example by an overlying metal plate 15 which is in turn clamped toward the top wall of the casing by the tube 4 as shown in Fig. 1. The strip 14 accurately conforms to and frictionally engages the inner surface of windshield 9, holding the latter accurately in alinement and in frictional contact with the adjacent portion of shell 3, and reinforces the windshield against bending out of shape during use, and also minimizes the ingress of foreign matter into passageway 10. It is also found that the movement of the windshield between its active position shown in Fig. 1 and its inactive position where it is for the most part housed within passageway 10, is rendered more facile. A suitable number of springy tongues 16 (Fig. 1) struck inwardly from the sheet metal of windshield 9, may serve as stops engaging under strip 14 to limit the outward movement of the windshield 9, its inward movement being limited by a flange 17 at the top of the windshield which engages the upper rim of shell 3 when the windshield is in inner inactive position.

While the invention has been disclosed as carried out by a lighter of the specific structure described, it should be understood that changes may be made therein without departing from the invention in its broader aspects, within the scope of the appended claims.

I claim:

1. A cigar lighter having a fuel casing, said casing having a burner opening extending through an exterior wall thereof and also having therein a passageway extending through said exterior wall into the interior of the casing and shaped to largely surround said burner opening, a windshield also having side walls shaped to largely surround said burner opening and slidably received within said passageway to move between an inner position exposing the space adjacent the burner opening and an outer position shielding said space, said casing carrying, adjacent the aforesaid exterior wall thereof, a member extending transversely partially across said passageway from one wall thereof into pressing engagement with the adjacent side of said windshield, to thereby urge the opposite side of the windshield into contact with its corresponding side of said passageway, the aforesaid transversely extending portion of said last mentioned member substantially closing the portion of the passageway which lies between the windshield and the wall of the passageway from which said last mentioned member extends.

2. A cigar lighter having a fuel casing, said casing having a burner opening extending through an exterior wall thereof and also having therein a passageway extending through said exterior wall into the interior of the casing and shaped to largely surround said burner opening, a windshield member also having side walls shaped to largely surround said burner opening and slidably received within said passageway to move between an inner position exposing the space adjacent the burner opening and an outer position shielding said space, the portion of the casing which is bounded by said passageway carrying a strip of elastic material partially overhanging said passageway and having its overhanging portion shaped to fit closely against the inner side wall of said windshield member in both of the aforesaid positions of the latter, said last mentioned strip of elastic material substantially closing the portion of the passageway which lies between the windshield and the wall of the passageway which carries said elastic material, said elastic material bearing resiliently against the adjacent face of said windshield to thereby urge the opposite face of the windshield into contact with its corresponding side of said passageway.

WARREN I. NISSEN.

REFERENCES CITED

The following references are of record in the file of this patent:

UNITED STATES PATENTS

| Number | Name | Date |
|---|---|---|
| 1,353,334 | Geslani | Sept. 21, 1920 |
| 1,755,746 | Perrera | Apr. 22, 1930 |
| 1,998,339 | Stansbury | Apr. 16, 1935 |

FOREIGN PATENTS

| Number | Country | Date |
|---|---|---|
| 652,738 | France | Oct. 29, 1928 |
| 771,123 | France | July 16, 1934 |